No. 853,227. PATENTED MAY 14, 1907.
J. K. CUFF.
LOADING AND UNLOADING APPARATUS.
APPLICATION FILED AUG. 29, 1906.
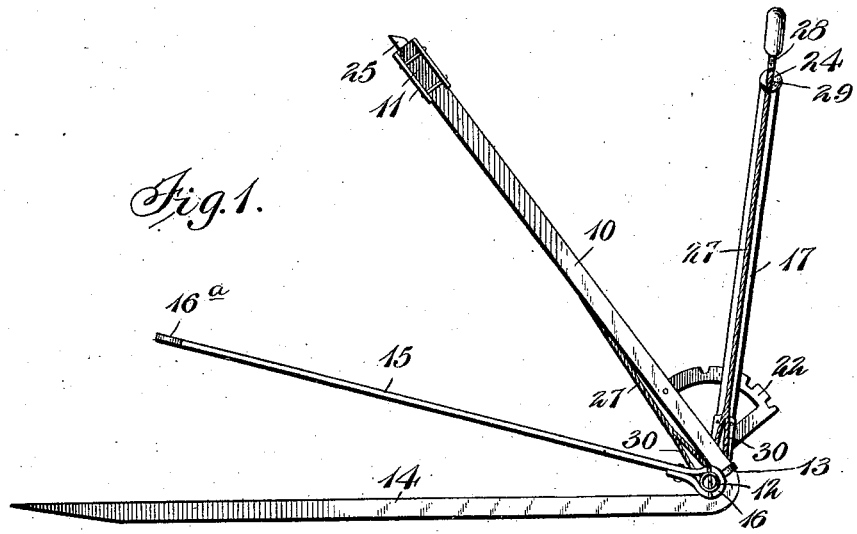
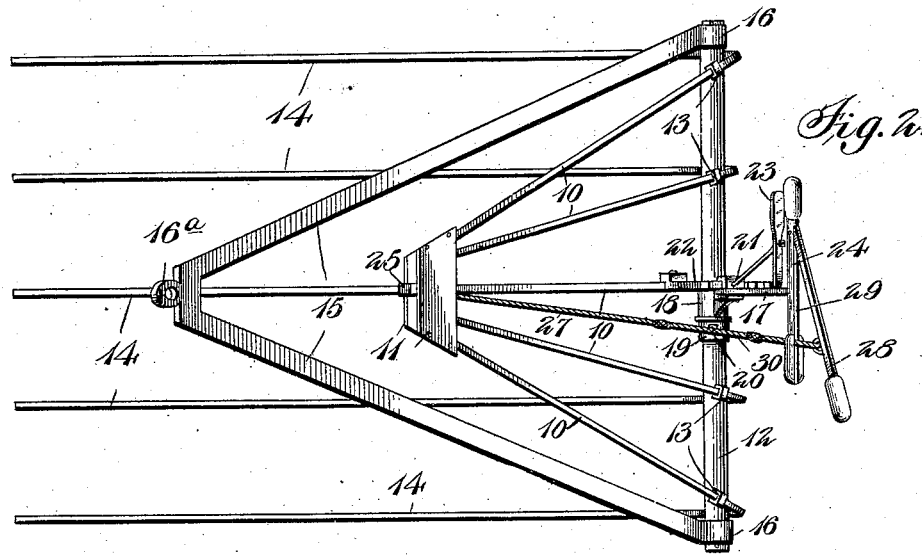
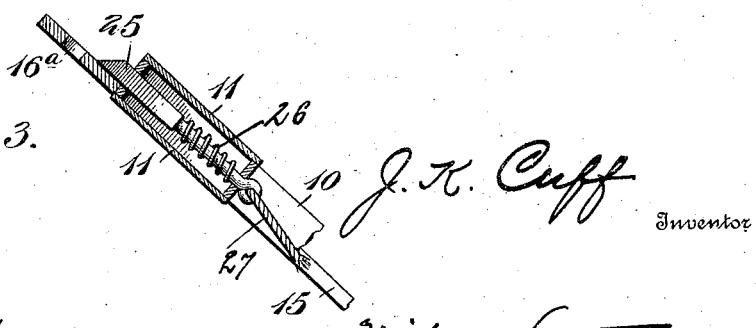
Witnesses
W. H. Ourand
N. A. Schmidt
J. K. Cuff
Inventor
By Milo B. Stevens & Co.
Attorneys
THE NORRIS PETERS CO., WASHINGTON, D. C.

UNITED STATES PATENT OFFICE.

JOHN KENNEDY CUFF, OF SPANISH, MONTANA.

LOADING AND UNLOADING APPARATUS.

No. 853,227.     Specification of Letters Patent.     Patented May 14, 1907.

Application filed August 29, 1906. Serial No. 332,461.

*To all whom it may concern:*

Be it known that I, JOHN KENNEDY CUFF, a citizen of the United States, residing at Spanish, in the county of Madison and State of Montana, have invented new and useful Improvements in Loading and Unloading Apparatus, of which the following is a specification.

This invention is an apparatus for loading and unloading, and has for its object to provide a fork or grapple embodying certain novel features of construction hereinafter described and claimed.

In the accompanying drawing:—Figure 1 is an elevation showing the fork in position for loading; Fig. 2 is a plan view; Fig. 3 is a sectional detail showing the position of the parts when the fork is being hoisted.

Referring specifically to the drawing, the fork comprises a series of bars 10 which extend at their upper ends between spaced plates 11 to which they are fastened. The bars extend downwardly divergingly from the plate to a cross rod 12 to which they are made fast by straps 13 or other suitable means. The bars also extend under the rod 12 and forwardly therefrom as at 14 to form the tines of the fork.

At 15 is indicated a bail, the two branches of which have bearings 16 in which the rod 12 is mounted whereby a hinge or pivotal connection is had between the bail and the fork. The bail is of such size that the fork can swing therethrough, and at the outer end of the bail is an eye 16ª for attachment of the team or the hoisting rope.

At or about the middle of the rod 12 is a handle 17 which is made fast to a sleeve 18 loosely mounted on the rod. Between the sleeve and rod is a wear sleeve 19 which is made fast to the rod by a set screw 20 or other suitable means. The handle carries a spring latch 21 adapted to engage a segmental rack 22 secured to the back of one of the bars 10. The operating lever or handle 23 of the spring latch is adjacent the grip 24 of the handle 17 so that it can be conveniently operated.

Between the plates 11 is mounted a sliding latch 25 which is held normally extended by a spring 26. The latch is operated by a rope 27, which is connected to a lever 28 pivoted to the grip 24. The grip has a groove 29 into which the lever may be extended so that it will not be in the way of the hands of the operator when he is holding the grip and guiding the fork. The rope 27 is doubled at 30 to straddle the rod 12 so that it shall have only a small amount of slack, which prevents it from becoming tangled.

The apparatus is loaded by drawing it forwardly, the team being hitched to the bail 15. The handle 17 will be locked to the fork by the engagement of the latch 21 with the rack 22, so that the depth at which the tines enter the material can be readily controlled by pressing down or lifting on the handle. When the apparatus is hoisted, the bail swings up and strikes the latch 25 whereby the fork is held from tilting forwardly to discharge the load. The handle 17 will be disengaged from the fork by withdrawing the latch 21 from the rack 22. This leaves the handle free and enables the operator to guide the fork therewith. Upon withdrawing the latch 25 the fork is released and swings forwardly through the bail whereupon the load slides off the fork and is discharged. After the fork is emptied, the handle 17 will again be locked to the fork after which the apparatus is ready for re-loading.

The apparatus is simple and reliable in operation, and as the latches 21 and 25 are operated from the grip 24, the apparatus is at all times under control of the operator. Loose material can be handled by covering the tines with a sheet metal plate.

I claim:—

1. An apparatus for loading and unloading comprising a bail, the two branches of which have bearings, a rod mounted in the bearings and carrying a fork the head of which swings through the bail, releasable means for locking the fork to the bail, a sleeve loose on the rod, a handle secured to the sleeve, a segment rack on the fork, and a latch carried by the handle and engageable with the rack.

2. An apparatus for loading and unloading comprising a bail, the two branches of which have bearings, a rod mounted in the bearings and carrying a fork the head of which swings through the bail, a sleeve loose on the rod, a handle secured to the sleeve, a segment rack on the fork, a latch carried by the handle and engageable with the rack, a latch carried by the fork-head and engageable with the bail, and a lever pivoted to the handle and operatively connected to the last mentioned latch.

In testimony whereof I have signed my name to this specification in the presence of two subscribing witnesses.

JOHN KENNEDY CUFF.

Witnesses:
 BEN CREASY,
 I. G. KELLOGG.